(12) United States Patent
Kukula et al.

(10) Patent No.: US 9,242,682 B2
(45) Date of Patent: Jan. 26, 2016

(54) WIND DEFLECTOR OF AN OPENABLE VEHICLE ROOF

(71) Applicant: Webasto SE, Stockdorf (DE)

(72) Inventors: Andreas Kukula, Germering (DE); Erwin Kohout, München (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/657,315

(22) Filed: Mar. 13, 2015

(65) Prior Publication Data

US 2015/0284037 A1    Oct. 8, 2015

(30) Foreign Application Priority Data

Apr. 2, 2014 (DE) .......................... 10 2014 004 992

(51) Int. Cl.
  *B60J 7/22* (2006.01)
  *B62D 35/00* (2006.01)
  *B62D 29/00* (2006.01)

(52) U.S. Cl.
  CPC . *B62D 35/00* (2013.01); *B60J 7/22* (2013.01); *B62D 29/00* (2013.01)

(58) Field of Classification Search
  CPC ........................................................ B60J 7/22
  USPC ....................................................... 296/217
  See application file for complete search history.

(56) References Cited

U.S. PATENT DOCUMENTS

| 6,666,503 | B1* | 12/2003 | Sorensen | B60J 7/22 296/217 |
| 6,834,914 | B2 | 12/2004 | Böhm et al. | |
| 9,004,584 | B1* | 4/2015 | Cadena | B60J 7/22 296/217 |
| 2003/0168892 | A1 | 9/2003 | Bohm et al. | |
| 2008/0284211 | A1* | 11/2008 | Oerke | B60J 7/22 296/217 |

FOREIGN PATENT DOCUMENTS

DE         102 10 142 A1    9/2003

* cited by examiner

*Primary Examiner* — Dennis H Pedder
(74) *Attorney, Agent, or Firm* — Fitch, Even, Tabin & Flannery LLP

(57) ABSTRACT

The invention relates to a wind deflector of an openable vehicle roof, with a base element that can be attached to the vehicle roof, with a raising bow that can be deployed relative to the base element, and with a flexible wind deflector element which is attached with its upper edge to the raising bow and with its lower edge to the base element, and which is held tensed between the raising bow and the base element when the raising bow is deployed, wherein it is provided according to the invention that, when the raising bow is deployed, a lateral end section of the wind deflector element is in a tensed position without attachment at its lower edge relative to the base element or a roof frame and/or without attachment at its upper edge relative to the raising bow.

7 Claims, 2 Drawing Sheets

WIND DEFLECTOR OF AN OPENABLE VEHICLE ROOF

CROSS REFERENCE TO RELATED APPLICATION

Figure 1:
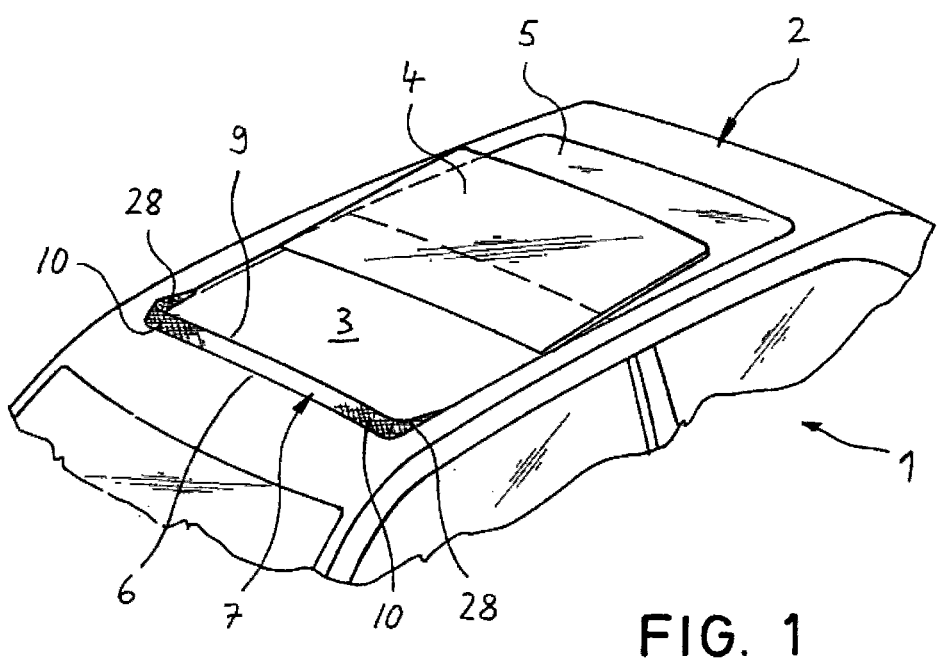

The present application is based on and claims priority of German Patent Application No. 10 2014 004 992.2 filed Apr. 2, 2014. The entire disclosure of the above-identified application, including the specification, drawings and claims are incorporated herein by reference in its entirety for all purposes.

The invention relates to a wind deflector of an openable vehicle roof, with a base element that can be attached to a vehicle roof, with a raising bow that can be deployed relative to the base element, and with a flexible wind deflector element which is attached with its upper edge to the raising bow and with its lower edge to the base element, and which is held tensed between the raising bow and the base element when the raising bow is deployed.

DE 102 10 142 A1 discloses a wind deflector of the generic type with a flexible wind deflector element which consists of a canvas and/or an air permeable film, for example, and which is attached, for example, by injection, over its entire length with its lower edge to a base element and with its upper edge to a raising bow.

The invention is based on the problem of producing a wind deflector mentioned at the beginning, which is improved with regard to its structure and its functionality.

In the wind deflector according to the invention mentioned at the beginning, the problem is solved in that, when the raising bow is deployed, a lateral end section of the wind deflector element is in a tensed position without attachment at its lower edge relative to the base element or to a roof frame and/or without attachment at its upper edge relative to the raising bow.

Advantageous embodiments of the invention are indicated in the dependent claims.

The wind deflector according to the invention is thus characterized in that the flexible wind deflection element which is produced from a mesh, a fabric or a film, for example, and which is flexible and foldable and in particular also air-permeable, is attached in the usual manner at its central section, which is transverse to the flow direction during running operation and which performs the essential wind deflection function, to the raising bow or to the base element, for example, by means of a weather strip or by injection on said components made of plastic, in particular. On the respective side area of the wind deflector, where the wind deflector element extends in particular substantially in the flow direction or in the longitudinal direction of the vehicle or roof, according to a first variant, the wind deflector element, in the area of its lateral end section, is attached neither at its upper edge to the raising bow nor at its lower edge to the base element or to a functionally equivalent part such as a roof-side mounting frame or roof frame, for example. When the raising bow is deployed in its functional position, the wind deflector element is held tensed from the attachment site where its attachment to the raising bow or to the base element ends, in a direction toward its lateral end.

According to a second variant, the wind deflector element, in the area of its end section, is free only at its lower edge and without attachment on the base element or on a roof-side component, while the end section of the wind deflector element is attached at its upper edge to the raising bow.

According to a third variant, the wind deflector element, in the area of its end section, is free only at its upper edge and without attachment on the raising bow, while the end section of the wind deflector element is attached at its lower edge to the base element or to a roof-side component.

The respective attachment of the end section of the wind deflector element can be formed to be continuous or with interruptions, for example, at several attachment sites that are separated from one another.

Without attachment means that the respective end section is not attached in the usual manner to the raising bow or to the base element, and that such an attachment has instead been dispensed with and that the end section with its upper edge or its lower edge in the deployed and tensed position assumes the desired position, which can correspond to that of a firm attachment.

The wind deflector element or wind deflector mesh thus covers the side areas and improves the acoustic behavior of the wind deflector, without the need for additional installation space for attachment elements or attachment devices.

The size, length and shape of the end section can be selected, for example, as a function of the length of the end-side raising bow section which forms a lateral deployment arm and can be adapted to it. The tensioning of the wind deflector element in the area of its end section then occurs preferably in the direction toward the swivel bearing of the raising bow or of the deployment arm, or along the raising bow or the deployment arm. Such a wind deflector or raising bow is usually mounted so that it can swivel about a transverse swivel axis, on two lateral deployment arms which are swivelably mounted on a roof frame. In the operating position of the wind deflector, the deployment arms are upwardly prestressed, for example, by spring devices, and they can be swiveled downward by means of a movable cover of the openable vehicle roof or by an adjustment device into their rest position. However, other types of adjustment devices can also be provided. The two deployment arms extend preferably substantially in the longitudinal direction of the vehicle or roof or in the flow direction. However, the deployment arms can also be arranged so that they form an acute angle with respect to one another.

Advantageously, the end section of the wind deflector element contains an attachment means with a tension device that engages with it, in particular a spring. The attachment means is or contains, for example, an eyelet or a loop or the like, to which a tension device, such as a rubber band or a tension spring, is attached, which in turn is supported on the roof frame or on a component in the area of the bearing device of the raising bow.

According to a preferred configuration, the raising bow or the deployment arm comprises a guide or contact surface on which the upper edge of the end section of the wind deflector element, which is held tensed, is guided or held. In this manner, the end section of the wind deflector element can assume a defined position even without attachment on the raising bow or deployment arm. Such an installation or guide can also be provided for the lower edge of the end section of the wind deflector element.

The wind deflector according to the invention can thus be designed in particular so that the base element is shortened in the side area and extends only along a section of the lower edge of the end section of the wind deflector element, or leaves the lower edge entirely free. Thus, the resulting free space present allows the possibility of arranging another component not required for the attachment of the wind deflector element, on the roof frame in this area, or for the possibility of the roof frame having, for example, a convexity or elevation. The base element consequently can comprise a side margin part that is shortened compared to the raising bow or deployment arm and that adjoins a corner area, a rounded one, for example.

Advantageously, the respective end section of the wind deflector element can be formed as a single piece. However, the end section can also be formed as an independent part and connected to the wind deflector element, for example, by bonding or sewing.

Below, the invention is explained in further detail based on an embodiment example of a wind deflector according to the invention in reference to the drawing.

Figure 2:
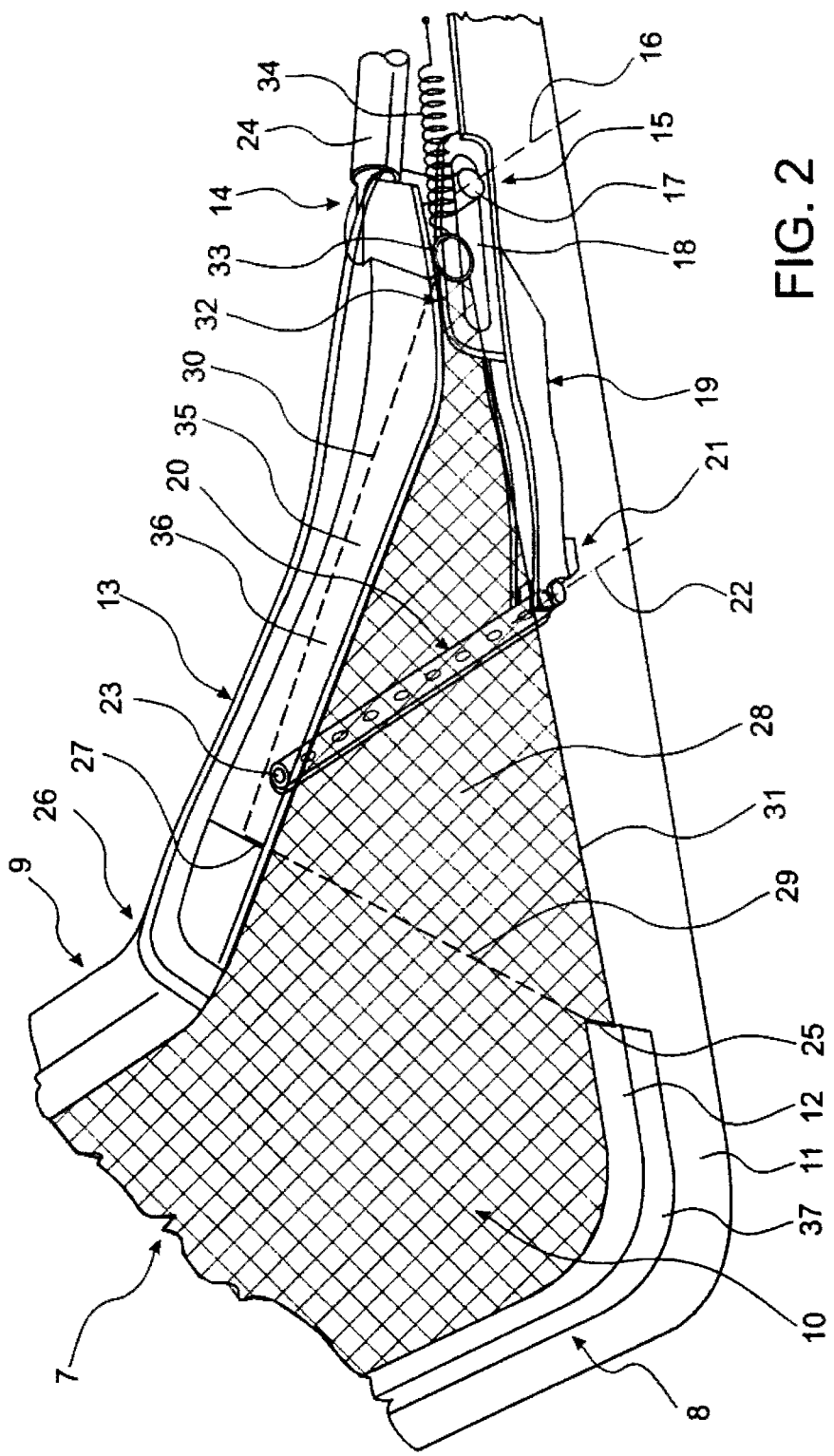

FIG. 1 shows a vehicle with an opened vehicle roof and a deployed wind deflector in a perspective view; and FIG. 2 shows the deployed wind deflector in a perspective view.

A vehicle 1, such as, for example, a passenger car (see FIG. 1) includes a vehicle roof 2 with a roof opening 3 and a cover 4, for example, of a sliding roof or a sliding-tilting roof, which can be adjusted in a known manner between a closed position which closes the roof opening 3 and an open position which opens the roof opening 3 (see FIG. 1) as well as in intermediate positions. A rear section of the roof opening 3 can be closed, for example, by means of a rear movable or fixed rear cover 5.

A wind deflector 7 associated with the front margin 6 of the roof opening 3 includes a base element 8, a raising bow 9 and a wind deflector element formed by a wind deflector mesh 10. The base element 8 extends substantially along the front margin 6 of the roof opening 3, is attached to a roof frame 11 surrounding the roof opening 3, and, on the side, it comprises a short side margin part 12 extending rearward along the longitudinally extending lateral roof frame portion. The raising bow 9 comprises on the side a deployment arm 13 which extends in the longitudinal direction of the vehicle or roof, and on its rear end 14 it is mounted by means of a bearing device 15 so that it can swivel about a transverse swivel axis 16, for example, by means of a bearing pin 17 which is mounted in a manner so that it can be swiveled and moved longitudinally on a longitudinal guide or elongate hole recess 18 of a support portion 19 arranged on the roof frame 11.

A swivel lever 20 is hinged, on the one hand, at the front end 21 of the bearing part 19 about a swivel axis 22, and, on the other hand, at the deployment arm 13 about a swivel axis 23. A tension spring 24 is attached at the rear end 14 of the deployment arm 13 and, when the roof is open, it pulls the raising bow 9 into the functional position represented in FIG. 2, in which the deployment arm 13 is swiveled upward by the swivel lever 20 about the transverse swivel axis 16, and the wind deflector mesh 10 is tensed between the base element 8 and the raising bow 9. When the roof opening 3 is in the process of being closed, the cover 4, which moves forward into its closed position, in sliding contact with the upper side of the deployment arm 13, presses the raising bow 9 around the transverse swivel axis 16 downward, wherein the swivel lever 20 controls a forward displacement of the raising bow 9. The wind deflector mesh 10 is relaxed and it folds up.

The wind deflector mesh 10 is firmly attached with its central section at the bottom to the base element 8 and at the top to the raising bow 9, for example, it is injection molded on these components made of plastic or attached by means of a weather strip. The firm attachment ends at the bottom at the base element 8 at a lower attachment site 25 which is located approximately at the rear end of the side margin part 12, and at the top on the deployment arm 13 which is spaced from a corner area 26 at an upper attachment site 27. A lateral end section 28 of the wind deflector mesh 10 extends from these two attachment sites 25 and 27 and from a connecting line 29 between these attachment sites 25 and 27 rearward in the direction of the bearing device 15, wherein an upper edge 30 and a lower edge 31 of the end section 28 taper off towards the rear, and, in the end area 32 of the end section 28, an attachment means 33 such as an eyelet, for example, is provided, to which a tension device 34 such as, for example, a tension spring or other resilient tension element, is attached and applies a rearward directed traction to the end section 28, particularly when the raising bow 9 is deployed.

The end section 28 of the wind deflector mesh 10 extends at its lower edge 31 freely and without attachment on a component such as, for example, the base element 8. Since no attachment or immediate guiding of the lower edge 31 is provided and required, the base element 8 in the section from the attachment site 25 rearward is not necessary. Accordingly, a free space remains above the roof frame 11, which can be occupied by another component or an elevation or convexity of the roof frame 11.

In this embodiment example, the end section 28 of the wind deflector mesh 10 also extends freely at its upper edge 30 and without attachment on the deployment arm 13 of the raising bow 9. When the raising bow 9 is deployed, the upper edge 30 can be received, for example, in a U-shaped downwardly open recess 35 of the correspondingly formed deployment arm 13 and guided therein on the inner side(s) 36 of the deployment arm 13, when the end section 28 is tensioned toward the rear. The end section 28 thus has an approximately triangular shape, which corresponds to the area between the deployed deployment arm 13 and the roof frame 11 or an optionally provided lateral base element (not shown in FIG. 2) which extends in the prolongation of the side margin part 12, and it covers this triangular area when the wind deflector 7 is deployed.

The position of the two attachment sites 25 and 27 and of the connecting line 29 can be varied as needed. Thus, the upper attachment site 25 can be arranged, for example, approximately at the corner area 26 of the raising bow 9 at the beginning of the deployment arm 13, and the lower attachment site 27 accordingly can be arranged at the lower corner area 37 of the base element 8. With this position of the attachment sites 25 and 27 as well, the end section 28 of the wind deflector mesh 10 is tensioned starting from the connecting line 29 in the form of a flat lateral outer surface.

The individual features disclosed in the description and in reference to the embodiment example as well as the figures can be combined in any technically advantageous arrangements and configurations with the respective subject matter of the invention in its general form.

The invention claimed is:

1. A wind deflector of an openable vehicle roof, comprising:
    a base element that can be attached to the vehicle roof,
    a raising bow that can be deployed relative to the base element, and
    a flexible wind deflector element which is attached with its upper edge to the raising bow and with its lower edge to the base element, and which is held tensed between the raising bow and the base element when the raising bow is deployed, and
    wherein when the raising bow is deployed, a lateral end section of the wind deflector element is in a taut position without attachment at its lower edge relative to the base element or a roof frame and/or without attachment at its upper edge relative to the raising bow.

2. The wind deflector of claim 1, wherein when the raising bow is deployed, the lateral end section of the wind deflector element is held tensed along a side arm or deployment arm of the raising bow.

3. The wind deflector of claim 1, wherein the lateral end section of the wind deflector element comprises an eyelet, with a spring tension device engaged therewith.

4. The wind deflector of claim 1, wherein the raising bow comprises a guide or a contact surface on which the upper edge of the end section of the wind deflector element, held tensed, is guided or held.

5. The wind deflector of claim 1, wherein the base element comprises on the side a side margin part which is shortened compared to the raising bow or deployment arm.

6. The wind deflector of claim 1, wherein the respective end section of the wind deflector element forms a single piece with the latter or in that the end section is formed as an independent part and connected to the wind deflector element.

7. The wind deflector of claim 1, wherein the wind deflector element is formed from a material selected from the group consisting of a fabric, a mesh and a film.

* * * * *